(12) United States Patent
Yagi

(10) Patent No.: US 8,327,362 B2
(45) Date of Patent: Dec. 4, 2012

(54) WORKFLOW INFORMATION GENERATION UNIT CONFIGURED TO CONSTRUCT A WORKFLOW WITH A PLURALITY OF PROCESSES AND DETERMINE ITS ALLOWABILITY, A METHOD OF CONSTRUCTING THE SAME, AND AN IMAGE PROCESSING APPARATUS CONFIGURED TO EXECUTE THE SAME

(75) Inventor: Atsuko Yagi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 433 days.

(21) Appl. No.: 12/591,696

(22) Filed: Nov. 30, 2009

(65) Prior Publication Data

US 2010/0138835 A1      Jun. 3, 2010

(51) Int. Cl.
*G06F 9/46*          (2006.01)
(52) U.S. Cl. ...................................... 718/100
(58) Field of Classification Search .................. None
See application file for complete search history.

(56) References Cited

U.S. PATENT DOCUMENTS

| | | | | |
|---|---|---|---|---|
| 5,848,393 A * | 12/1998 | Goodridge et al. | ........... | 705/7.27 |
| 6,151,583 A * | 11/2000 | Ohmura et al. | ............... | 705/7.26 |
| 7,039,861 B2 | 5/2006 | Yagi | | |
| 7,093,250 B1 * | 8/2006 | Rector | .......... | 718/100 |
| 7,185,007 B2 | 2/2007 | Yagi | | |
| 7,454,613 B2 | 11/2008 | Yagi | | |
| 7,636,918 B2 * | 12/2009 | Kadashevich | ............... | 718/105 |
| 2003/0221170 A1 | 11/2003 | Yagi | | |
| 2005/0024355 A1 | 2/2005 | Yagi | | |
| 2005/0066196 A1 | 3/2005 | Yagi | | |
| 2006/0041896 A1 | 2/2006 | Yagi | | |
| 2006/0277544 A1 * | 12/2006 | Bjoernsen et al. | ............ | 718/100 |
| 2009/0019132 A1 | 1/2009 | Kamata et al. | | |
| 2009/0049181 A1 | 2/2009 | Yagi | | |
| 2009/0185219 A1 | 7/2009 | Yagi | | |

FOREIGN PATENT DOCUMENTS

| | | |
|---|---|---|
| JP | 2007-293677 | 11/2007 |
| JP | 2008-097586 | 4/2008 |
| JP | 4180438 | 9/2008 |

OTHER PUBLICATIONS

Abstract of JP 2004-341617 published on Dec. 2, 2004.

* cited by examiner

*Primary Examiner* — Emerson Puente
*Assistant Examiner* — Gregory Kessler
(74) *Attorney, Agent, or Firm* — Harness, Dickey & Pierce

(57) ABSTRACT

A workflow information generation unit is used for constructing a workflow configured with a plurality of processes. Information of the processes is storable in a workflow information storage. The workflow information generation unit includes a process-designation information obtaining unit, an advance notice output unit, an implementation-determination information obtaining unit, a process information output unit, a result information output unit. The process-designation information obtaining unit obtains information designating a process to be included in the workflow. The advance notice output unit outputs advance notice information to notify that information of the designated process is to be stored in the workflow information storage. The implementation-determination information obtaining unit obtains implementation-determination information indicating whether the designated process is allowed to be included in the workflow. The process information output unit stores information of the designated process to the workflow information storage. The result information output unit outputs result information for the designated process.

10 Claims, 7 Drawing Sheets

| ID | WORKFLOW NAME | PROCESS CONTENT | |
|---|---|---|---|
| 001 | project A | PROCESS a, PROCESS b, PROCESS c ··· | |
| 002 | project B | PROCESS d, PROCESS e, PROCESS f ··· | ··· |
| 003 | project C | PROCESS g, PROCESS h, PROCESS i ··· | |
| ⋮ | | | |

FIG. 3
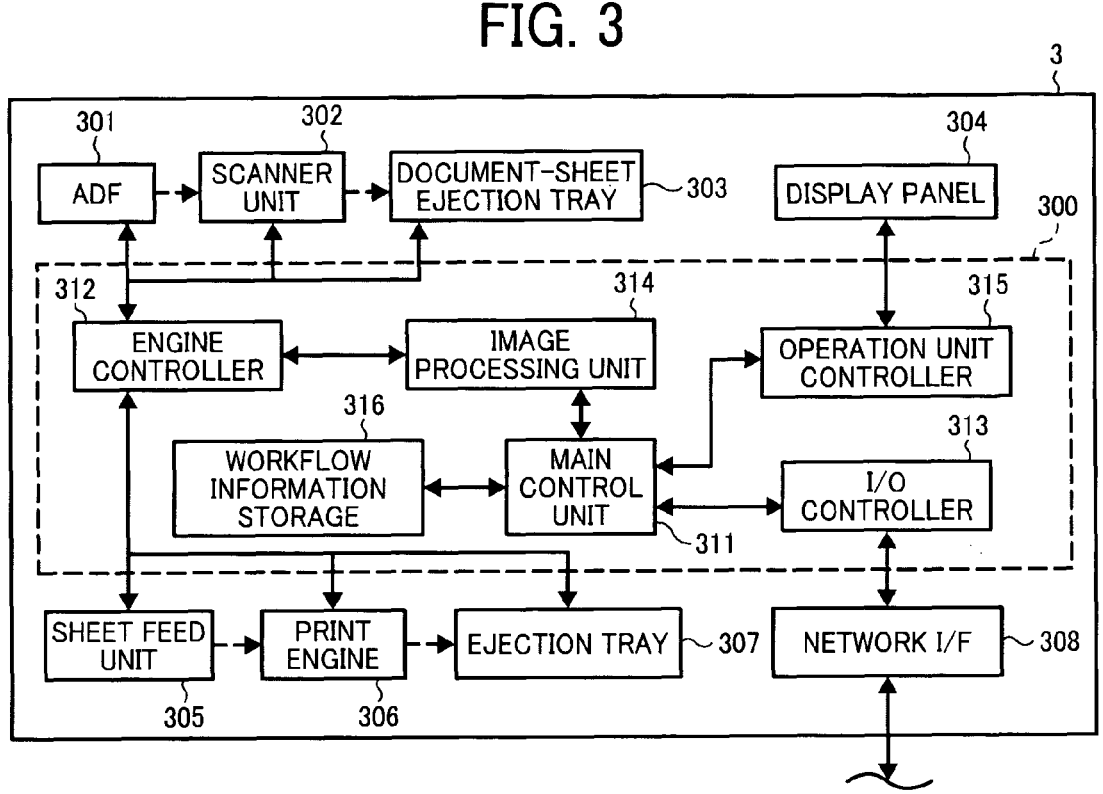
FIG. 4
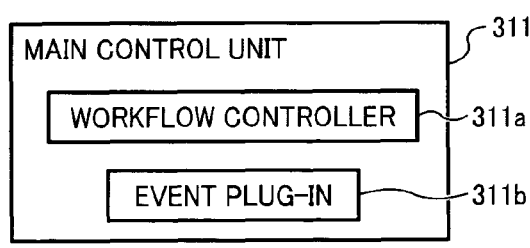
FIG. 5
| ID | WORKFLOW NAME | PROCESS CONTENT | |
|---|---|---|---|
| 001 | project A | PROCESS a, PROCESS b, PROCESS c ··· | |
| 002 | project B | PROCESS d, PROCESS e, PROCESS f ··· | ··· |
| 003 | project C | PROCESS g, PROCESS h, PROCESS i ··· | |
| | | ⋮ | |

FIG. 6
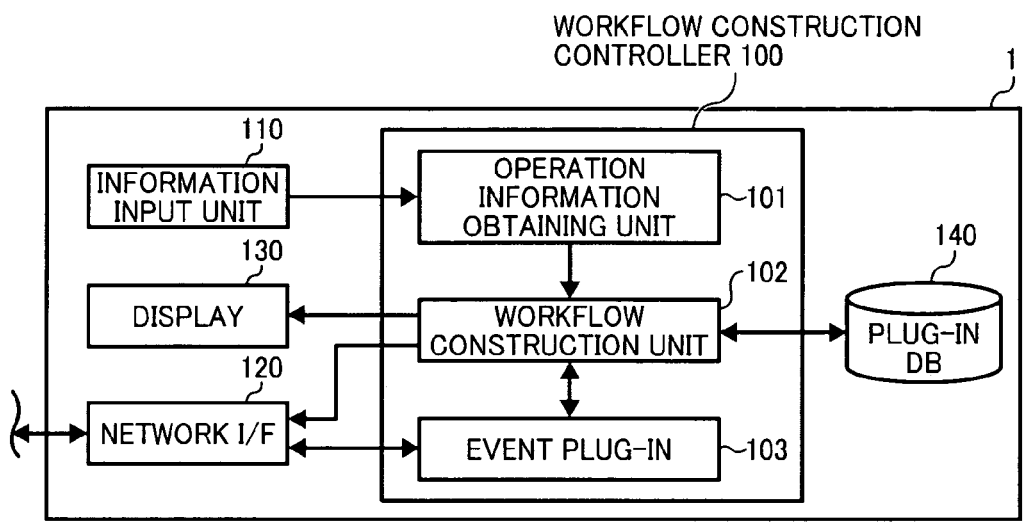
FIG. 7
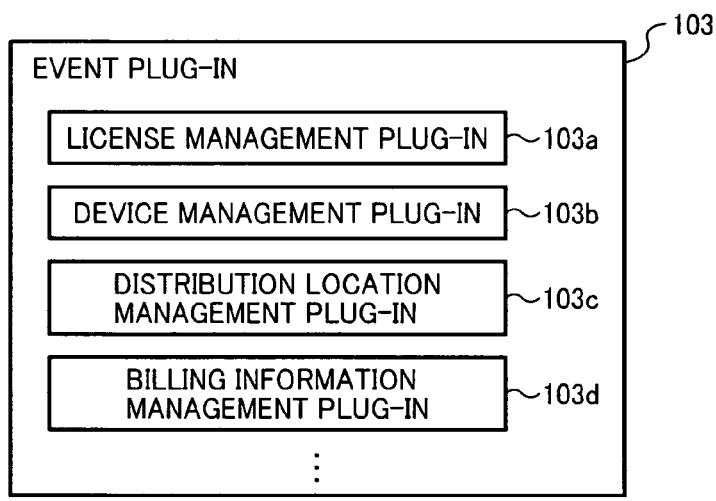
FIG. 8
| ID | PLUG-IN NAME | LICENSEABLE NUMBER | PRESENT NUMBER OF REGISTRATION | |
|---|---|---|---|---|
| 001 | plug-in a | xxxx | xxxx | |
| 002 | plug-in b | xxxx | xxxx | ... |
| 003 | plug-in c | xxxx | xxxx | |
| | | ⋮ | | |

FIG. 9

| ID | DEVICE NAME | NUMBER OF ALLOWABLE REGISTRATION | PRESENT NUMBER OF REGISTRATION | |
|---|---|---|---|---|
| 001 | printer A | xxxx | xxxx | |
| 002 | Fax A | xxxx | xxxx | ... |
| 003 | Scanner A | xxxx | xxxx | |
| ⋮ | | | | |

FIG. 10

| ID | ADDRESS OF DISTRIBUTION LOCATION | DISTRIBUTION STATUS | |
|---|---|---|---|
| 001 | xxxx@xxxx.com | ALLOWED | |
| 002 | ooo@oooo.com | NOT-ALLOWED | ... |
| 003 | ¥¥xxxx¥xxx¥xxx | ALLOWED | |
| ⋮ | | | |

FIG. 11

| ID | PLUG-IN NAME | BILLING MONEY VALUE | |
|---|---|---|---|
| 001 | plug-in a | ○○○○ | |
| 002 | plug-in b | ○○○○ | ... |
| 003 | plug-in c | ○○○○ | |
| ⋮ | | | |

FIG. 12

PRE-PAID MONEY VALUE

PREDETERMINED MONEY VALUE

ACCUMULATED BILLED MONEY VALUE

⋮

WORKFLOW INFORMATION GENERATION UNIT CONFIGURED TO CONSTRUCT A WORKFLOW WITH A PLURALITY OF PROCESSES AND DETERMINE ITS ALLOWABILITY, A METHOD OF CONSTRUCTING THE SAME, AND AN IMAGE PROCESSING APPARATUS CONFIGURED TO EXECUTE THE SAME

CROSS-REFERENCE TO RELATED APPLICATIONS

This application claims priority to Japanese Patent Application No. 2008-304950, filed on Nov. 28, 2008 in the Japan Patent Office, which is hereby incorporated by reference herein in its entirety.

BACKGROUND OF THE INVENTION

1. Field of the Invention

The present invention relates to a workflow information generation unit, a method of generating workflow information, an image processing apparatus, a control program for generating workflow information, an image processing apparatus, and a storage medium for the control program, and more particularly, to maintaining consistency of workflow information.

2. Description of the Background Art

Utilization of digitized information (hereinafter referred to as electronic information or electronic data) has been expanding in many fields of business, industry, and the like. Digitized information can be generated by scanning documents with scanners, and may be output as printed images using printers or facsimile machines. As such, image processing apparatuses such as printers, facsimiles, and scanners are now indispensable for handling such digitized information.

Such image processing apparatuses may include functions such as image capture, image formation, and communication, so that these image processing apparatuses can be used as printers, facsimiles, scanners, and copiers. Moreover, some image processing apparatuses may be configured as multi-function peripherals by incorporating multiple functions of a printer, facsimile machine, scanner, and copier in one machine. In addition, file management systems like that described in JP-2008-97586-A are known, in which digitized documents are stored on a document management server or distributed to designated locations (e.g., destinations identified by computer addresses) and used.

In such file management systems, a given workflow may be developed to handle file information efficiently. For example, a workflow configured with a scanner function and an information processing function may be developed to efficiently store file information.

Typically, corporate users use such file management systems for managing file information generated in the course of business activities, wherein such file management systems are based on a workflow scheme. In general, corporations or companies each have their own in-house information infrastructure configured with a given e-mail system and a given network environment in which the file management system is used. Because each corporation or company uses its own unique in-house information infrastructure suited to its business activities, it is difficult to develop a file management system that can be adapted to every kind of network environment in advance.

Given that network environments may be different for different entities, workflow systems embodied as software development kits (SDK) and application programming interfaces (API) have been developed. Such programming tools as SDK and API enable users to configure workflow programs adapted to their own user-specific environment and needs.

In general, a workflow program may be configured with a plurality of processes in a given system environment. For example, when a workflow for storing file information is developed in a given system environment, such workflow may include a scanning process, a document formatting process, a mailing process, or the like, which needs to be executed to complete the workflow. When API is employed in such workflow, some of these processes may be executed using an externally-provided program, which may not be provided in the given system environment as a default program.

Further, by employing API, events which occur in a given system environment may be reported to an externally provided program, wherein the event may be a given operation such as counting the executed number of given process, for example. When such event occurs, the externally provided program may not be used to execute processes included in a given workflow but may instead execute a given procedure that the externally provided program is supposed to execute in view of a system condition or operations executed for the system.

For example, in the above-described file management system, the workflow may include a billing process, executed using an externally provided program, which may be used to charge a given fee to a user depending, for example, on volume of document information which is processed in such workflow. When a result of storage of digitized documents or file distribution processing is reported to an externally provided program using API, the externally provided program executes a billing process based on the volume of document information that is stored in a memory or the number of distribution addresses to which the file information is distributed.

With the above-described SDK, when an event occurs in a given workflow system, the event is reported to an externally provided program via API after a process related to the event is executed. Such event may be referred as an "after-event" because the event is reported to the externally provided program only after the process related to the event is actually executed. When the after-event is reported, the externally provided program can comprehend a system condition, status or the like. However, because the process related to the after-event has already occurred, the externally provided program to which the after-event has been reported cannot intervene in the operation of workflow system, despite the fact that the process related to the event may not be adequate for implementing the workflow system.

For example, assume a workflow scheme is configured with a plurality of processes executed using externally provided programs, in which a billing process is included to charge a fee for a given procedure. If one process is executed using one externally provided program and the billing process is executed for such one process, but thereafter another process is not correctly executed by another externally provided program because of an error, the workflow cannot be completed. In this case, although the workflow cannot be completed and the user cannot achieve his or her objective, he or she is still charged a fee by the billing process for such one process executed by the externally provided program.

Further, assume another case in which a user is to configure a workflow scheme by adding a process to the workflow, wherein the process may be executed by using an externally provided program. Such externally-provided program may be referred to as a "plug-in" or "plug-in program." When a process is added to a workflow scheme, event information indicating addition of the process is reported to the externally provided program via API. In such a case, an addition to the workflow may be rejected by the plug-in program for some reason, for example, because of conditions placed on the number of licenses. If the workflow including such a rejection by the plug-in program is developed by a user, and the user implements such workflow, the plug-in program cannot be executed, thus necessitating reconfiguration of the workflow.

As such, if an event is reported to an externally provided program (or plug-in program) via API after an after-event occurs, the user is able to recognize that there is an error in the workflow scheme only after the workflow is implemented. Such error may be referred to as inconsistency of information included or related to a workflow, and as described above such information inconsistency included in a workflow cannot be detected immediately when the workflow scheme is developed. In addition, such information inconsistency may occur not only in a workflow system for file management system but also in SDK systems using an externally provided program via API.

SUMMARY

In one aspect of the present invention, a workflow information generation unit used for constructing a workflow configured with a plurality of processes is devised. Information of the plurality of processes is includable in the workflow and storable in a workflow information storage using the workflow information generation unit. The workflow information generation unit includes a process-designation information obtaining, an advance notice output unit, an implementation-determination information obtaining unit, a process information output unit, and a result information output unit. The process-designation information obtaining unit obtains process-designation information designating a process to be included in the workflow. The advance notice output unit outputs advance notice information notifying that information of the process designated by the obtained process-designation information is to be stored in the workflow information storage before storing information of the designated process in the workflow information storage. The implementation-determination information obtaining unit obtains implementation-determination information when the advance notice information is output. The implementation-determination information indicates whether the designated process is allowed to be included in the workflow. The process information output unit stores information of the designated process to the workflow information storage when the obtained implementation-determination information indicates that the designated process is allowed to be included in the workflow. The result information output unit outputs result information for the designated process by preliminarily running the designated process when constructing the workflow. The result information is prepared based on the obtained implementation-determination information indicating whether the designated process is allowed to be included in the workflow.

In another aspect of the present invention, a method of constructing a workflow configured with a plurality of processes is devised. Information of the processes for constructing the workflow is storable in a workflow information storage using a workflow information generation unit. The method includes steps of a) obtaining, b) outputting, c) obtaining, d) storing, and e) outputting. In step a), obtaining process-designation information designating a process to be included in the workflow is obtained using a process-designation information obtaining unit. In step b), advance notice information is output by using an advance notice output unit. The advance notice information notifies that information of the process designated by the obtained process-designation information is to be stored in the workflow information storage before storing the designated process in the workflow information storage. In step c), implementation-determination information is obtained when the advance notice information is output using an implementation-determination information obtaining unit. The implementation-determination information indicates whether the designated process is allowed to be included in the workflow. In step d), information of the designated process is stored to the workflow information storage, using a process information output unit, when the obtained implementation-determination information indicates that the designated process is allowed to be included in the workflow. In step e), result information for the designated process is output by preliminarily running the designated process when constructing the workflow using a result information output unit. The result information is prepared based on the obtained implementation-determination information indicating whether the designated process is allowed to be included in the workflow.

In another aspect of the present invention, an image processing apparatus that executes a workflow configured with a plurality of processes is devised. The image processing apparatus includes a workflow information generation unit, an execution instruction obtaining unit, an advance notice output unit, an implementation-determination information obtaining unit, a process execution unit, and a result information output unit. The workflow information generation unit is used for constructing a workflow constructable by storing information of the processes in a workflow information storage. The execution instruction obtaining unit obtains information to designate a workflow to be executed and information to instruct execution of the workflow. The advance notice output unit outputs advance information notifies that the processes included in the workflow are to be implemented. The implementation-determination information obtaining unit obtains implementation-determination information for the processes when the advance information is output. The implementation-determination information indicates whether the processes included in the workflow are implementable. The process execution unit executes the processes included in the workflow when the obtained implementation-determination information indicates the processes included in the workflow are implementable. The result information output unit outputs result information indicating a result of the implemented process based on the obtained implementation-determination information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 shows a block diagram of functional configuration of an image processing apparatus according to an example embodiment;

FIG. 4 shows a schematic configuration of a main control unit of an image processing apparatus according to an example embodiment;

FIG. 5 shows example information stored in a workflow information storage according to an example embodiment;

FIG. 6 shows a block diagram of functional configuration of administrator terminal according to an example embodiment;

FIG. 7 shows example event plug-ins for the administrator terminal according to an example embodiment;

FIG. 8 shows example information retained by a license management plug-in according to an example embodiment;

FIG. 9 shows example information retained by a device management plug-in according to an example embodiment;

FIG. 10 shows example information retained by distribution location management plug-in according to an example embodiment;

FIG. 11 shows example information retained by a billing information management plug-in according to an example embodiment;

FIG. 12 shows example information retained by a billing information management plug-in according to an example embodiment;

Figure 1:
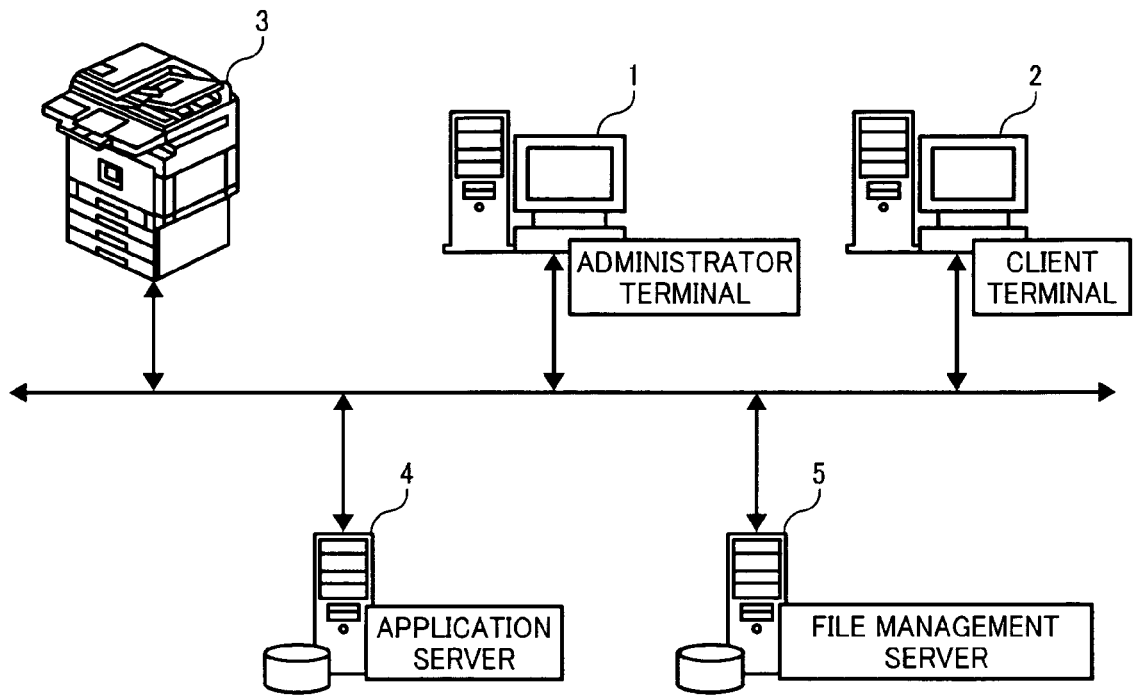
FIG. 1 illustrates an example usage environment of a file management system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise.

Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

Referring now to the drawings, an information processing system or apparatus according to an exemplary embodiment is described. The information processing system may be used for a file management system, for example, but not limited thereto.

FIG. 1 shows an example usage environment of file management system according to an exemplary embodiment. The term of file may indicate any processable data such as for example document information, but not limited thereto. As shown in FIG. 1, the file management system may include an administrator terminal 1, a client terminal 2, an image processing apparatus 3, an application server 4, and a file management server 5, for example. An administrator that administers the file management system may use the administrator terminal 1, and the administrator terminal 1 may be installed with administration tools to administer the file management system. The administrator terminal 1 may include functions, which may function with a configuration according to an example embodiment.

The client terminal 2 may be an information processing terminal, which is used and operated by a user. The image processing apparatus 3 may include an image capture function, an image forming function, and a communication function or the like, for example, but not limited thereto. For example, the image processing apparatus 3 may be a multi-functional image processing apparatus usable as printer, facsimile, scanner, and copier. The image processing apparatus 3 may be managed by a control system configured with SDK (software development kit). Under such SDK, a workflow may be configured by a user for a given purpose. For example, a workflow for file storage and/or file distribution system may be configured.

Further, the image processing apparatus 3 may use an externally provided program (hereinafter, referred to as "plug-in" or "plug-in program") executed for a given process with API (application programming interface) provided for SDK. The plug-in may function with a control system of the image processing apparatus 3. The types of plug-in may include a "process plug-in," which is incorporated in a workflow to conduct a given image processing or the like, and an "event plug-in," which may be used to determine a system condition based on an event to be occurred for the system, for example. The plug-in will be described in detail later.

As similar to the above-described process plug-in, the application server 4 may provide given image processing functions which may be incorporated and implemented in a workflow. The file management server 5 may be a data server, which stores information such as document information, for example. Document information stored in the file management server 5 may be image information having file name extensions such as "jpg," "pdf," or the like, and text information having file name extensions such as "txt," "doc," or the like, for example. The administrator terminal 1, the client terminal 2, the image processing apparatus 3, the application server 4, and the file management server 5 may be connected each other via a network, for example.

Figure 2:
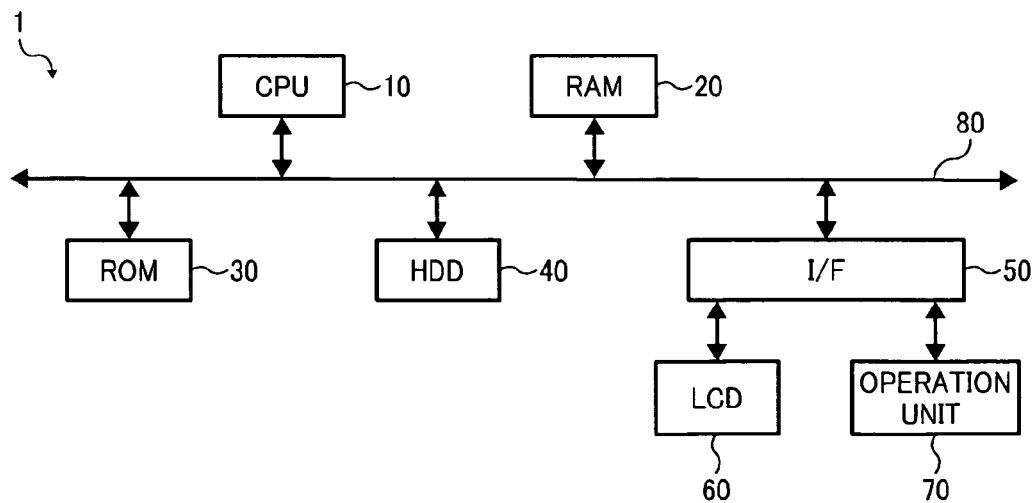
FIG. 2 illustrates an example block diagram of hardware configuration of information processing terminal according to an example embodiment.

A description is now given to a hardware configuration of information processing terminal used in an example embodiment with reference to FIG. 2, wherein the information processing terminal may be the administrator terminal 1, the client terminal 2, the image processing apparatus 3, the application server 4, and/or the file management server 5.

FIG. 2 shows a block diagram of example hardware configuration of the administrator terminal 1 which is used as information processing terminal according to an example embodiment. The hardware configuration of FIG. 2 may be similarly applied for the client terminal 2, the image processing apparatus 3, the application server 4, and the file management server 5. The image processing apparatus 3 may further include an engine unit for implementing scanner and printer functions in addition to the hardware configuration shown in FIG. 2, for example.

As shown in FIG. 2, the administrator terminal 1 may employ a hardware configuration, which may be employed for information processing terminal such as a server, PC (personal computer), or the like. For example, the administrator terminal 1 may include a central processing unit 10 (CPU 10), a random access memory 20 (RAM 20), a read only memory 30 (ROM 30), a hard disk drive 40 (HDD 40), and an interface 50 (I/F 50), which are coupled or connected each other via a bus 80. Further, the I/F 50 may be coupled or connected to a liquid crystal display 60 (LCD 60) and an operation unit 70 (e.g., keyboard panel), for example.

The CPU 10 is used as a computing unit, and controls the administrator terminal 1 as a whole. The RAM 20 is a volatile memory, to which information can be read and written at a higher speed, and used as a working memory when the CPU 10 processes information. The ROM 30 is a non-volatile memory, which can be used as a read only memory, in which a program such as firmware may be stored. The HDD 40 is a non-volatile memory, to which information can be read and written, and may store OS (operating system), various control programs, application programs, for example.

The I/F 50 connects the bus 80 and various hardwares and networks, and controls information communication. The LCD 60 is used as a visual user interface, by which a user can check status of the administrator terminal 1. The operation unit 70 may be used as a user interface, by which a user can input information to the administrator terminal 1, wherein the user interface may include a keyboard, a mouse, or the like. As described above with reference to FIG. 1, the application server 4 and the file management server 5 may be used as a server, in which the user interface such as LCD 60 and operation unit 70 can be removed.

In such hardware configuration, a program stored in a memory (e.g., ROM 30, HDD 40, optical disk) is read on the RAM 20, and then the CPU 10 executes the program. By combining software and hardware, the information processing terminal such as administrator terminal 1 can implement a designed functional configuration.

A description is now given to a functional configuration of the image processing apparatus 3 with reference to FIG. 3. FIG. 3 shows an example block diagram of functional configuration of the image processing apparatus 3. As shown in FIG. 3, the image processing apparatus 3 may include a controller 300, an automatic document feeder (ADF) 301, a scanner unit 302, a document-sheet ejection tray 303, a display panel 304, a sheet feed unit 305, a print engine 306, an ejection tray 307, and a network I/F (interface) 308, for example. The controller 300 may include a main control unit 311, an engine controller 312, an I/O (input/output) controller 313, an image processing unit 314, an operation unit controller 315, and a workflow information storage 316, for example, wherein one or more devices in the controller 300 may be used to implement given functions. As shown in FIG. 3, the image processing apparatus 3 may be a multi-functional image processing apparatus including the scanner unit 302, and the print engine 306, for example. In FIG. 3, an electrical connection is shown by a solid arrow line, and a sheet transportation is shown by a dashed arrow line.

The display panel 304 (e.g., touch panel) may be used as an output interface and an input interface. When used as the output interface, the display panel 304 displays status of the image processing apparatus 3 by displaying visual information. When used as the input interface, a user may touch the display panel 304 to input information or instruction to the image processing apparatus 3. As such, the display panel 304 may be used as an operation unit. The network I/F 308 is used as a communication interface for connecting the image processing apparatus 3 to other apparatuses or devices via a network. The network I/F 308 may be Ethernet (registered trademark) or USB (universal serial bus) interface, for example.

The controller 300 includes hardwares, which may be used with software for functioning the controller 300. Specifically, a control program such as firmware stored in a non-volatile memory (e.g., ROM 30, HDD 40, optical disk) is loaded on a volatile memory such as RAM 20, and then the CPU 10 including hardware such as integrated circuit executes the program, by which the controller 300 functions as a controller using software and hardware. The controller 300 controls the image processing apparatus 3 as a whole. Further, as above described, the controller 300 may function as a software-using controller by employing SDK and an externally provided program.

The main control unit 311 may control each unit included in the controller 300 by issuing instructions to the each unit. The main control unit 311 may include a workflow controller 311a and an event plug-in 311b as shown in FIG. 4. The workflow controller 311a controls the engine controller 312, the I/O controller 313, and the image processing unit 314, and controls an implementation of workflow based on an instruction from a user via the display panel 304 and the operation unit controller 315, wherein the workflow may be developed by a user using the display panel 304 and the operation unit controller 315. Accordingly, the workflow controller 311a may function as a main controller for SDK system used for the image processing apparatus 3.

The event plug-in 311b may be electrically or communicably connected to the workflow controller 311a of the main control unit 311. When a given action such as "event" is to be occurred for the image processing apparatus 3, such "event" information is transmitted to the event plug-in 311b via the workflow controller 311a, and then the event plug-in 311b conducts a given process when such "event" information is matched to a certain condition. Such "event" information is output to the event plug-in 311b before a workflow to be developed by a user is actually executed by the workflow controller 311a. Accordingly, such "event" information may be referred to as "before-event" information of a given process included or to-be-included in a workflow, which is reported before the given process is conducted. Accordingly, "before-event" information may be an advance notice that a certain process is to be conducted later. The event plug-in 311b may be configured with one or more externally provided programs using SDK and API. Such event plug-in 311b may be used to conduct a given processing in an example embodiment.

The engine controller 312 may control and drive the print engine 306 and the scanner unit 302, for example. The I/O controller 313 may be used to input signals or instructions, input via the network I/F 308, to the main control unit 311. Further, the main control unit 311 controls the I/O controller 313 so that the main control unit 311 can access to the file management server 5 or the like via the network I/F 308 and a network. Further, the I/O controller 313 may conduct a function of storing or distributing file information, which may be conducted as a process in a workflow when instructed by a user (hereinafter, referred to as file processing function).

The image processing unit 314 generates image writing information, under a control of the main control unit 311, based on image information to be output as a printed image. The print engine 306, used as image forming unit, uses the image writing information to write an image during image forming operation. Further, when an scanning operation is conducted, the image processing unit 314 processes information captured by a scanning operation of the scanner unit 302 to generate image data, which is to be stored in the image processing apparatus 3 or transmitted to the file management server 5 via the network I/F 308.

Further, the image processing unit 314 may conduct given image processings such as process of optical character recognition (OCR), process of embedding information, or the like which may be conducted as one process in workflow when a user instructs given instructions. Such function may be referred to as image processing function, hereinafter.

The file processing function included in the I/O controller 313, and the image processing function included in the image processing unit 314 may be implemented by one or more process plug-ins, wherein the process plug-in may be provided as an externally provided program using SDK and API, which may be referred to as an application program, for example.

The operation unit controller 315 displays information on the display panel 304. Further, when information is input via the display panel 304, the operation unit controller 315 transmits the input information to the main control unit 311.

The workflow information storage 316 stores information used for a workflow, which may be conducted by the image processing apparatus 3 when a user instructs a given instruction. FIG. 5 shows example information stored in the workflow information storage 316. As shown in FIG. 5, the workflow information storage 316 may store information of identification (ID) information for identifying types of workflow, workflow names, and process contents included in workflow. As shown in FIG. 5, one workflow may be configured with a plurality of processes, for example.

In FIG. 5, one workflow has an ID "001," a workflow name of "project A" including a plurality of process contents of "process a", "process b", "process c," for example. Similarly, another workflow has an ID "002," a workflow name of "project B" including a plurality of process contents of "process d", "process e", "process f," and another workflow has an ID "003," a workflow name of "project C" including a plurality of process contents of "process g", "process h", "process i." When a user instructs an execution of a workflow, the workflow controller 311a obtains process contents to be executed from the workflow information storage 316, and then lets process plug-ins corresponded to each of the process to execute the process contents.

The processes such as "process a," "process b," "process c" shown in FIG. 5 may be conducted by the image processing unit 314 or the I/O controller 313 of the image processing apparatus 3, or the application server 4, for example.

A description is given to an example case when the image processing apparatus 3 is used as a printer. In this case, the I/O controller 313 receives a print job instruction from an external apparatus via the network I/F 308, for example. The I/O controller 313 transfers the received print job instruction to the main control unit 311. When the main control unit 311 receives the print job instruction, the main control unit 311 controls the image processing unit 314 to generate image writing information based on file information or image information included in the print job instruction.

When the image processing unit 314 generates the image writing information, the engine controller 312 conducts an image forming operation on a recording medium (e.g., sheet), which is transported from the sheet feed unit 305, based on the generated image writing information. For example, the print engine 306 may employ an inkjet method, electrophotography, or the like as an image forming method, but not limited thereto. After the print engine 306 conducts the image forming operation on the recording medium, the recording medium is ejected to the ejection tray 307.

A description is given to an example case when the image processing apparatus 3 is used as a scanner. In this case, a scanning operation is instructed by a user by selecting a scan mode on the display panel 304, or by inputting a scanning instruction from an external apparatus such as client terminal 3 via the network I/F 308, by which a scan instruction signal is input to the image processing apparatus 3. Then, the operation unit controller 315 or the I/O controller 313 transfers the scan instruction signal to the main control unit 311. The main control unit 311 controls the engine controller 312 based on the received scan instruction signal.

Then, the engine controller 312 drives the ADF 301 to transport a document sheet set in the ADF 301 to the scanner unit 302. Further, the engine controller 312 drives the scanner unit 302 to scan the document sheet transported from the ADF 301. When a document sheet is not set in the ADF 301 but set in the scanner unit 302 directly, the scanner unit 302 scans the document sheet under a control of the engine controller 312. As such, the scanner unit 302 is used as an image capture unit.

When such image capturing process is conducted, an image sensor such as charge coupled device (CCD) disposed in the scanner unit 302 scans the document sheet using a light beam to generate captured image information. The engine controller 312 transfers the captured image information generated by the scanner unit 302 to the image processing unit 314. The image processing unit 314 receives the captured image information from the engine controller 312 and generates image information under a control of the main control unit 311. The image information, generated by the image processing unit 314, may be stored in a storage disposed in the image processing apparatus 3 such as HDD 40, for example.

Depending on user instruction, the image information, generated by the image processing unit 314, may be stored in the HDD 40 or transmitted to an external apparatus such as file management server 5 via the I/O controller 313 and the network I/F 308.

Further, a description is given to an example case when the image processing apparatus 3 is used as a copier. In this case, based on the captured image information that the engine controller 312 receives from the scanner unit 302 or image information generated by the image processing unit 314, the image processing unit 314 generates image writing information. Based on the image writing information, the engine controller 312 drives the print engine 306 to form an image on a recording medium (e.g., sheet) as similar to a printing operation.

A description is now given to the administrator terminal 1 with reference to FIG. 6, which shows an example block diagram of the administrator terminal 1. As shown in FIG. 6, the administrator terminal 1 may include a workflow construction controller 100, an information input unit 110, a network interface (I/F) 120, a display 130, and a plug-in database (DB) 140, for example.

The information input unit 110 may have a given configuration that enables a user to input information to the administrator terminal 1. For example, the information input unit 110 may include the I/F 50 and the operation unit 70 shown in FIG. 2, for example. The network I/F 120 may be used as an interface for the administrator terminal 1. Specifically, the administrator terminal 1 obtains information from a network via the network I/F 120, or the administrator terminal 1 transmits information to a network via the network I/F 120. For example, the network I/F 120 may be the I/F 50 shown in FIG. 2. More specifically, the network I/F 120 may be Ethernet (registered trademark) interface, USB interface, or the like, for example. The display 130 may have a given configuration, which enables displaying of operation status of the administrator terminal 1, a result of searching operation, or the like. For example, the display 130 may include the I/F 50 and the LCD 60 shown in FIG. 2. The plug-in database (DB) 140 may include information of plug-in programs such as process plug-ins (e.g., data formatting, data scanning), for example.

In the administrator terminal 1, the workflow construction controller 100 may be used to construct or configure a workflow to be conducted in the image processing apparatus 3. The workflow construction controller 100 may include an operation information obtaining unit 101, a workflow construction unit 102, and an event plug-in 103, for example, as shown in FIG. 6. Accordingly, the administrator terminal 1 including the workflow construction controller 100 can be used as a workflow information generator. The workflow construction controller 100 may be functioned when a program loaded on the RAM 20 (see FIG. 2) is run under a control of the CPU 10.

The operation information obtaining unit 101 receives information from the information input unit 110, wherein the information may be input to the information input unit 110 by a user. As such, the use may select information to be added to a workflow or deleted from a workflow, for example. In an example embodiment, the operation information obtaining unit 101 receives information for constructing a workflow. The workflow construction unit 102 constructs a workflow using information obtained from the operation information obtaining unit 101

Based on information input by a user, the workflow construction unit 102 stores workflow construction information in the workflow information storage 316 (see FIG. 5) and constructs a workflow by arranging a plurality of processes, wherein the plurality of processes included in workflow may be conducted by plug-ins or devices. In an example embodiment, the workflow construction unit 102 outputs information for constructing a workflow via the network I/F 120, and the workflow construction information is stored in the workflow information storage 316 of the image processing apparatus 3. Accordingly, the operation information obtaining unit 101 and the workflow construction unit 102 may function as a main controller for SDK system employed for the administrator terminal 1.

When a user inputs information, some information may be used as "before-event" information of a given process included or to be included in a workflow. When "before-event" information for a given process is input, the workflow construction unit 102 outputs event information to the event plug-in 103b before storing the given process as workflow construction information in the workflow information storage 316 (i.e., before constructing a workflow). Such "before-event" information may be an advance notice to notify that the given process is to be conducted or implemented later. Further, the workflow construction unit 102 may generate visual information used for constructing a workflow. For example, the workflow construction unit 102 may provide a graphical user interface (GUI) on the display 13, which is used for constructing a workflow (see FIGS. 14 and 15).

As similar to the event plug-in 311b of the image processing apparatus 3, the event plug-in 103 obtains an event information output by the workflow construction unit 102, and conducts a process when the obtained event has a certain condition. For example, when an instruction of adding one process plug-in to a workflow is issued, the event plug-in 103 obtains an event corresponding to such instruction, and determines whether the adding of one process plug-in can be allowed or not.

The event plug-in 103 may include a plurality of plug-ins to determine whether adding of given plug-ins can be allowed or not. Hereinafter, examples of plug-ins included in the event plug-in 103 are described with reference to FIG. 7. As shown in FIG. 7, the event plug-in 103 may include a license management plug-in 103a, a device management plug-in 103b, a distribution location management plug-in 103c, and a billing information management plug-in 103d, for example.

The license management plug-in 103a may retain information shown in FIG. 8. Based on such information, the license management plug-in 103a determines whether a process plug-in can be added (or registered) to a workflow in view of license condition, wherein such determination may be used as result information of the license management plug-in 103a. Specifically, the license management plug-in 103a retains information on license condition for application program, which is used to implement each of process plug-ins. As shown in FIG. 8, the license management plug-in 103a may include information on identification (ID) for identifying each process plug-in, plug-in name, licenseable number, and the present number of registration, for example. The licenseable number indicates the maximum number allowable for license registration. The present number of registration indicates the number of already registered license.

For example, when a registration of "plug-in a" (see FIG. 8) is instructed, the license management plug-in 103a checks the present number of registration of "plug-in a" against the licenseable number. If the present number of registration of "plug-in a" is determined same as the licenseable number, the license management plug-in 103a reports to the workflow construction unit 102 that the registration of "plug-in a" is impossible (or not allowed). With such configuration, a given process plug-in cannot be added and registered when the present number of registration of given process plug-in already becomes the maximum number (or upper limit number) of the licenseable number.

As such, the license management plug-in 103a may be used to determine whether a designated process is allowed to be included in a workflow based on usage condition information set for an application program. Further, the license management plug-in 103a may update information of the usage condition of the application program based on the result information.

If such configuration is not employed, a given process plug-in can be added and registered even when the present number of registration of given process plug-in already becomes the maximum number (or upper limit number) of the licenseable number, and then the given process plug-in may be used as information for constructing a workflow. However, such constructed workflow includes an error condition because of the above-mentioned, not-allowed registration condition. The above-described configuration according to an example embodiment can prevent such error-included workflow construction.

The device management plug-in 103b retains information (see FIG. 9), and determines whether a process plug-in can be added (or registered) to a workflow in view of device management condition, wherein the device may mean devices, apparatus, units, or the like, which may be referred to as an external device connected to the workflow information generation unit. Such determination may be used as result information of the device management plug-in 103b. Specifically, the device management plug-in 103b retains information license condition of the application server 4 and devices such as printer, facsimile, and scanner, for example, which may conduct processes included in a workflow. As shown in FIG. 9, the device management plug-in 103b may include information on identification (ID) for identifying each device or apparatus, device name, the number of allowable registration, and the present number of registration, for example. The number of allowable registration indicates the maximum number allowable for registration of device to a workflow. The present number of registration indicates the number of already registered device license.

For example, when a registration of "printer A" (see FIG. 9) is instructed, the device management plug-in 103b checks the present number of registration of "printer A" against the number of allowable registration of "printer A". If the present number of registration of "printer A" is determined same as the number of allowable registration of "printer A", the device management plug-in 103b reports to the workflow construction unit 102 that the registration of "printer A" is impossible (or not allowed).

Further, the device management plug-in 103b can determine whether a concerned device (e.g., printer A) can be registered in view of authority status of an administrator using the administrator terminal 1 to the concerned device, or in view of inter-connectablity or compatibility between the concerned device and other device or process plug-in.

With such configuration, a given device cannot be added and registered when the present number of registration of device already becomes the maximum number (or upper limit number) of the number of allowable registration; or a given device cannot be added and registered when the given device has incompatibility with another device.

As such, the device management plug-in 103b may be used to determine whether a given device is allowed to be included in a workflow based on usage condition information set for the given device. Further, the device management plug-in 103b may update information of the usage condition of the given device based on the result information.

If such configuration is not employed, a given device can be added and registered even when the present number of registration of device already becomes the maximum number (or upper limit number) of the number of allowable registration or when the given device has incompatibility with another device, and then the given device may be used as information for constructing a workflow. However, such constructed workflow includes an error condition because of the above-described not-allowed registration condition. The above-described configuration according to an example embodiment can prevent such error-included workflow construction.

The distribution location management plug-in 103c retains information (see FIG. 10), and determines whether a process plug-in can be added (or registered) to a workflow in view of status of distribution location. As shown in FIG. 10, the distribution location management plug-in 103c may include information on identification (ID) for identifying distribution location, address of distribution location, distribution status to the distribution location such as distribution is allowed or not-allowed. The address of distribution location may be e-mail address, path, or internet protocol (IP) address, for example, but not limited thereto.

For example, assume an example case that a given workflow is under construction. When a user instructs a distribution of information to an address of "xxx@xxx.com," information distribution to the concerned distribution location can be "allowed" as shown in FIG. 10. Then, the distribution location management plug-in 103c reports to the workflow construction unit 102 that the registration of address of "xxx@xxx.com" is possible or allowed. Accordingly, with such configuration, a given distribution location cannot be added and registered when the distribution location is not allowed for information distribution.

If such configuration is not employed, a given distribution location can be added and registered even when the distribution location is not allowed for information distribution, and the given distribution location may be used as information for constructing a workflow. However, such constructed workflow includes an error condition because of the above-described not-allowed distribution location. The above-described configuration according to an example embodiment can prevent such error-included workflow construction.

The billing information management plug-in 103d retains information (see FIGS. 11 and 12), and determines whether a process plug-in can be added (or registered) to a workflow in view of billing information prepared from charge money information corresponded to the process plug-in. As shown in FIG. 11, the billing information management plug-in 103d may include information on identification (ID) for identifying each process plug-in, plug-in name, and billing money value which is to be charged when registering a concerned process plug-in, wherein billing money value may be set by a contract or the like, for example. Further, as shown in FIG. 12, the billing information management plug-in 103d stores information of pre-paid money value, predetermined money value, and accumulated billed money value, for example. The pre-paid money value is money value paid in advance.

For example, when a registration (or adding) of "plug-in a" (see FIG. 11) is instructed, the billing information management plug-in 103d checks the pre-paid money value against billing money value for the "plug-in a." If it is determined that the pre-paid money value is less than the billing money value of "plug-in a" to be added to the workflow, the billing information management plug-in 103d reports to the workflow construction unit 102 that the registration of "plug-in a" is impossible (or not allowed).

Further, in another example case, when a registration of "plug-in a" (see FIG. 11) is instructed, the billing information management plug-in 103d checks the predetermined money value against an total money value composed of already accumulated billed money value and to-be-charged money value for "plug-in a," wherein the total money value is computed by adding the already accumulated billed money value and to-be-charged money value. If it is determined that the total money value is greater than the predetermined money value, the billing information management plug-in 103d reports to the workflow construction unit 102 that the registration of "plug-in a" is impossible (or not allowed). With such configuration, a given process cannot be added and registered when it is determined that an addition of the process is not allowed based on billing information.

If such configuration is not employed, a given process can be added and registered even when the process cannot be conducted, and the given process may be used as information for constructing a workflow. However, such constructed workflow includes an error condition because of the above-described not-allowable billing condition. The above-described configuration according to an example embodiment can prevent such error-included workflow construction.

Figure 13:
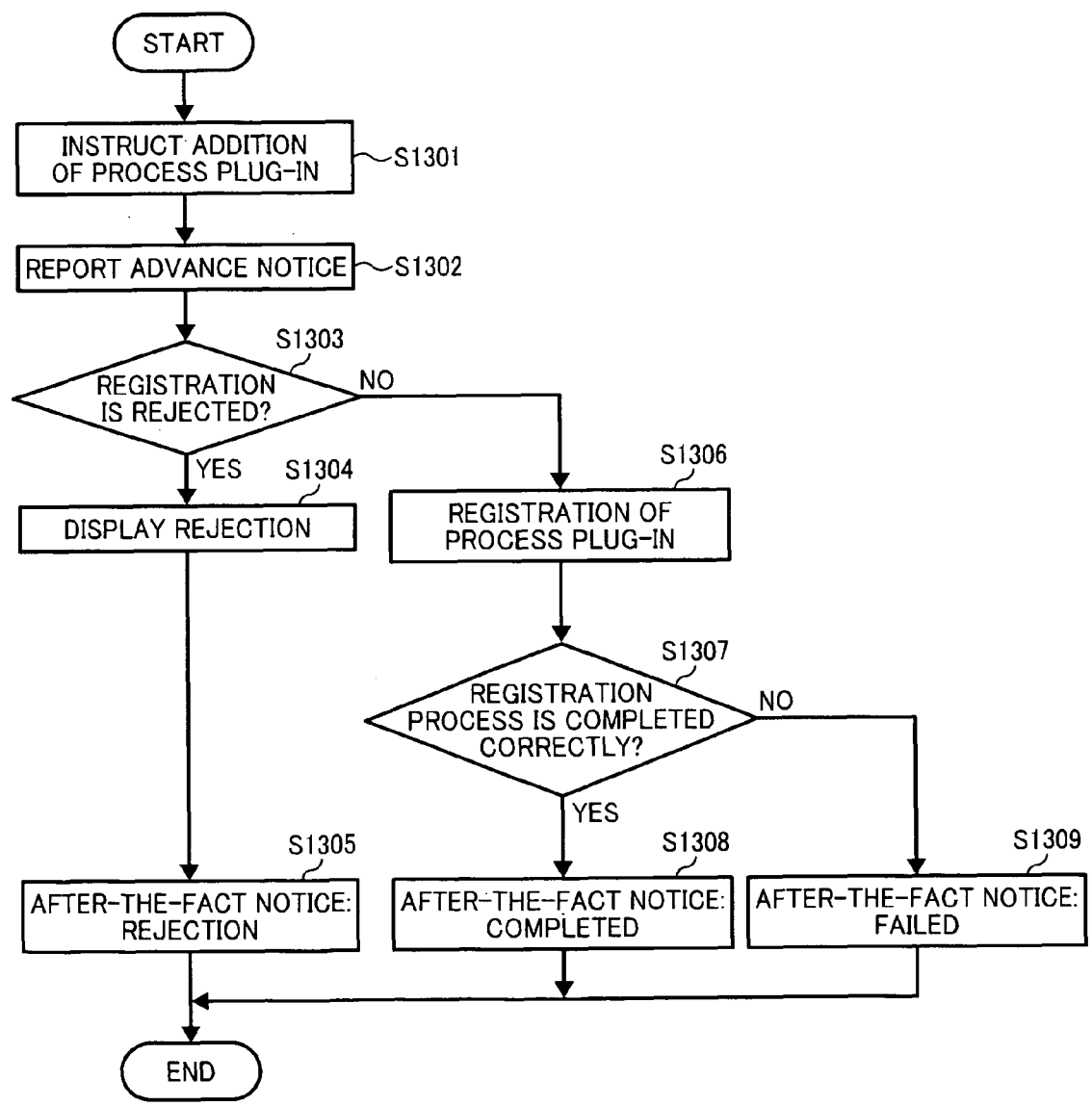
FIG. 13 is a flowchart showing a process of constructing a workflow by adding process plug-in according to an example embodiment.
Figure 14:
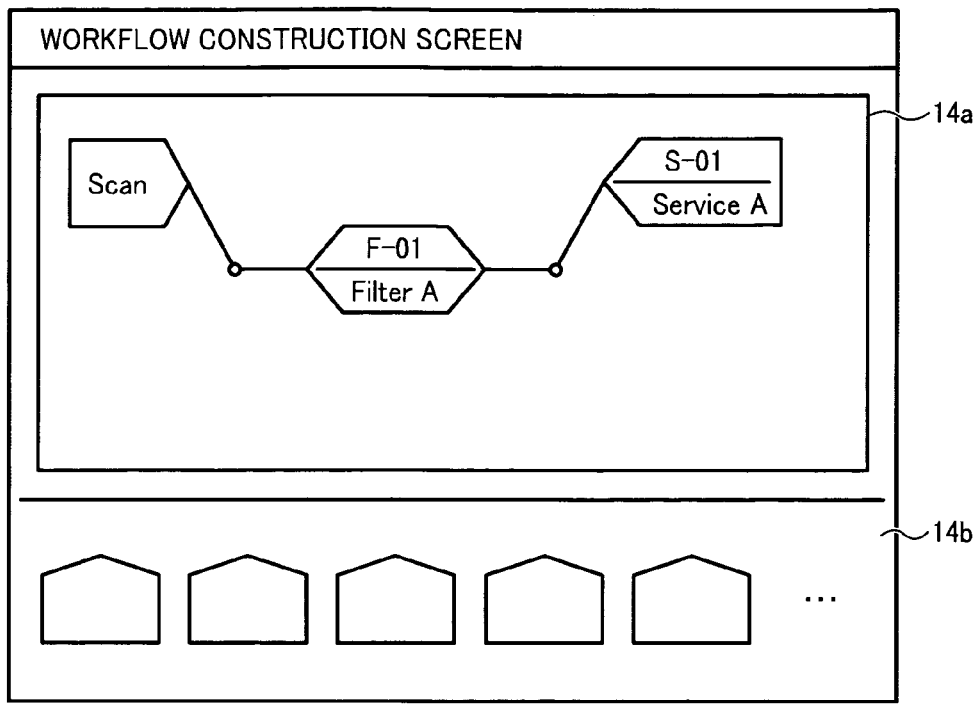
FIG. 14 illustrates an example workflow construction screen used for constructing a workflow according to an example embodiment.

A description is now given to a process of constructing a workflow according to an example embodiment, conducted using a file management system, with reference to FIGS. 13 and 14. FIG. 13 is a flowchart showing a process of constructing a workflow for the file management system, and FIG. 14 shows an example graphical user interface (GUI) used for developing a workflow for a file management system. Hereinafter, such GUI may be referred to as "workflow construction screen" as a whole.

As shown in FIG. 14, the workflow construction screen may include an icon arrangement window 14*a*, and an icon list window 14*b*, for example. The icon arrangement window 14*a* is used as a display portion for displaying process plug-ins to-be-included in a workflow and icons of devices, which conduct given processes, for example. Icons displayed on the icon arrangement window 14*a* can be linked to information stored in the workflow information storage 316 of the image processing apparatus 3. When a user develops a workflow using such workflow construction screen, workflow information can be stored in the workflow information storage 316 in a real time manner.

A user may use a pointing device such as a mouse to drag icons of plug-in or devices displayed on the icon list window 14*b*, and drop the dragged-icon on the icon arrangement window 14*a*, which may be referred to as a drag-and-drop process of icon. With such drag-and-drop procedure, the operation information obtaining unit 101 can obtain information for constructing a workflow, and then addition of process plug-in to a workflow is instructed to the workflow construction unit 102 (step S1301). Accordingly, at step S1301, the operation information obtaining unit 101 functions as a process-designation information obtaining unit, which obtains process-designation information, which designates a given process to added in a workflow. The operation information obtaining unit 101 inputs the obtained process-designation information to the workflow construction unit 102.

When the addition of process plug-in is instructed, the workflow construction unit 102 generates an event corresponding to the process plug-in to be added. Then, the workflow construction unit 102 reports the event corresponding to the adding process plug-in to the event plug-in 103 as "advance notice" before the process plug-in is added (or registered) in the workflow (step S1302). At step S1302, the "advance notice" includes information of the process plug-in, which is instructed to be added to the workflow. At step S1302, the "advance notice" is used to notice that a given process, to be added in a workflow, is to be stored in the workflow information storage 316. Accordingly, at step S1302, the workflow construction unit 102 may function as an advance notice output unit.

The event plug-in 103 determines whether a concerned process plug-in (e.g., see FIGS. 8 to 12) can be added (or registered) at step S1303. Accordingly, at step S1303, the event plug-in 103 may function as an implementation-determination unit. The event plug-in 103 inputs a result of implementation-determination at step S1303 to the workflow construction unit 102. Accordingly, at step S1303, the workflow construction unit 102 may function as an implementation-determination information obtaining unit.

Figure 15:
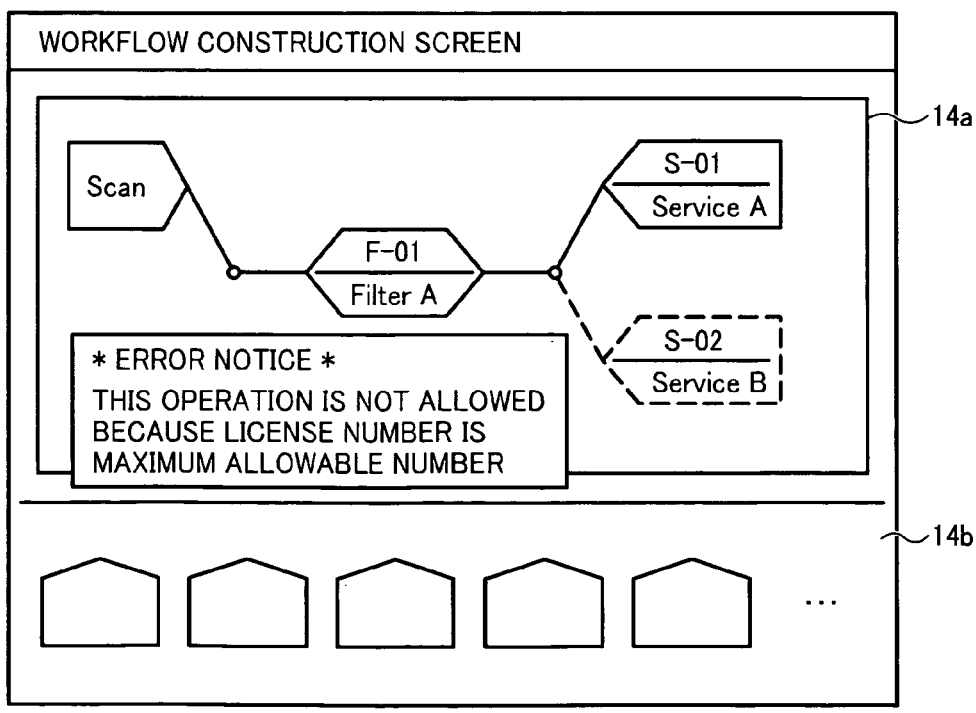
FIG. 15 illustrates another example workflow construction screen used for constructing a workflow according to an example embodiment; according to an example embodiment.

If the event plug-in 103 rejects the registration of concerned process plug-in (YES at step S1303), the workflow construction unit 102 generates rejection information that the addition of process plug-in is rejected as shown in FIG. 15, and displays the rejection information on the display 130 (step S1304). Accordingly, at step S1304, the workflow construction unit 102 may function as a notice information generator, which generates notice information that the addition of concerned process plug-in is impossible (or not allowed), wherein the notice information may be reported to a user as an error notice, for example. With such configuration, a user can immediately recognize an error of workflow when constructing the workflow.

Further, when the notice information indicating that the addition of concerned process plug-in is impossible (or not allowed) is reported to the user, a reason of such rejection (i.e., addition is impossible) can be reported with a given message as shown in FIG. 15. With such a configuration, a user can recognize types of error easily, by which a countermeasure for such error can be conducted without undue burden, by which user convenience can be enhanced.

Then, the workflow construction unit 102 reports an after-the-fact notice to the event plug-in 103 at step S1305, in which the after-the-fact notice is a notice that the addition of process plug-in instructed at step S1301 is rejected, and then the process ends. Accordingly, at step S1305, the workflow construction unit 102 may function as a result information output unit, which outputs result information determined from the processing at step S1303.

If the event plug-in 103 does not reject the registration of process plug-in (No at step S1303), the workflow construction unit 102 conducts the registration of process plug-in, which is instructed at step S1301 (step S1306).

At step S1306, the concerned information is registered in the workflow information storage 316. Accordingly, at step S1306, the workflow construction unit 102 outputs ID information of workflow being under construction, and information of process plug-in to be added to the workflow to the image processing apparatus 3 via the network I/F 120. Hereinafter, the ID information of workflow being under construction and information of process plug-in to be added to the workflow may be referred to as "workflow construction information," collectively. Accordingly, at step S1306, the workflow construction unit 102 may function as a process information output unit, which outputs process information of process plug-in. In the image processing apparatus 3, the I/O controller 313 receives the "workflow construction information" via the network I/F 308, and then inputs the "workflow construction information" to the main control unit 311.

When the main control unit 311 obtains the "workflow construction information", the main control unit 311 updates information in the workflow information storage 316, in which a designated process is added to the workflow designated by the ID at step S1306.

If the registration process is completed correctly (Yes at step S1307), the workflow construction unit 102 reports an after-the-fact notice indicating that the addition of process plug-in is completed successfully to the event plug-in 103 (step S1308), wherein the addition of process plug-in is instructed at step S1301, and then the process ends. Accordingly, at step S1308, the workflow construction unit 102 may function as a result information output unit.

At step S1308, the event plug-in 103 is reported with the after-the-fact notice indicating that the addition of process plug-in is completed successfully, and then the event plug-in 103 updates information shown in FIGS. 8, 9, and 12, for example. For example, the license management plug-in 103*a* and the device management plug-in 103*b* increment "the present number of registration" for the added process plug-in. Further, the billing information management plug-in 103*d* adds "billing money value" for the added process plug-in to "accumulated billed money value."

If the process is not completed successfully (No at step S1307), the workflow construction unit 102 reports an after-the-fact notice indicating that the addition of process plug-in is failed to the event plug-in 103 (step S1309), wherein the addition of process plug-in is instructed at step S1301, and the process ends. Accordingly, at step S1309, the workflow construction unit 102 may function as a result information output unit.

As such, in example embodiment, when a workflow construction is being conducted for the file management system, before a given process plug-in is actually added and registered, a notice that such addition and registration process is to be conducted is reported to the event plug-in 103 in advance. If the event plug-in 103 does not reject the addition (or registration) of given process plug-in, the workflow construction unit 102 conducts a registration process of given process plug-in actually. If the event plug-in 103 rejects the addition (or registration) of given process plug-in, the workflow construction unit 102 reports rejection of registration of given process plug-in to a user.

With such a configuration, when an addition of process plug-in is instructed, a user can recognize whether addition of a given process plug-in is rejected or accepted in a real time manner when a workflow is being under construction.

If the user cannot recognize the rejected or accepted status of addition of process plug-in in a real time manner when a workflow is being under construction, the user may construct a workflow including error. If such error-included workflow is constructed, such error may become obvious when the user actually executes the workflow for the first time. In such a case, the user needs to re-construct the workflow, by which user convenience is degraded, and an administrator may need to manage such error-included workflow, which may result into a greater burden for management of system.

As above described, in the file management system according to an example embodiment, a user can recognize whether addition of a given process plug-in is rejected or accepted in a real time manner when a workflow is being under construction. Accordingly, as for such file management system, user convenience can be enhanced and a management burden of administrator can be reduced.

Further, in the file management system according to an example embodiment, the workflow construction unit 102 issues the after-the-fact notice when a result of the addition of process plug-in is established at step S1305, S1308, S1309. Accordingly, the event plug-in 103 increments the number of registration and/or billing money only after the event plug-in 103 is received with a notice that the process for addition of process plug-in is completed (e.g., step S1308). With such a configuration, if the process for addition of process plug-in is not completed, the event plug-in 103 does not increment the number of registration and/or billing money, by which information consistency for workflow can be maintained.

Figure 16:
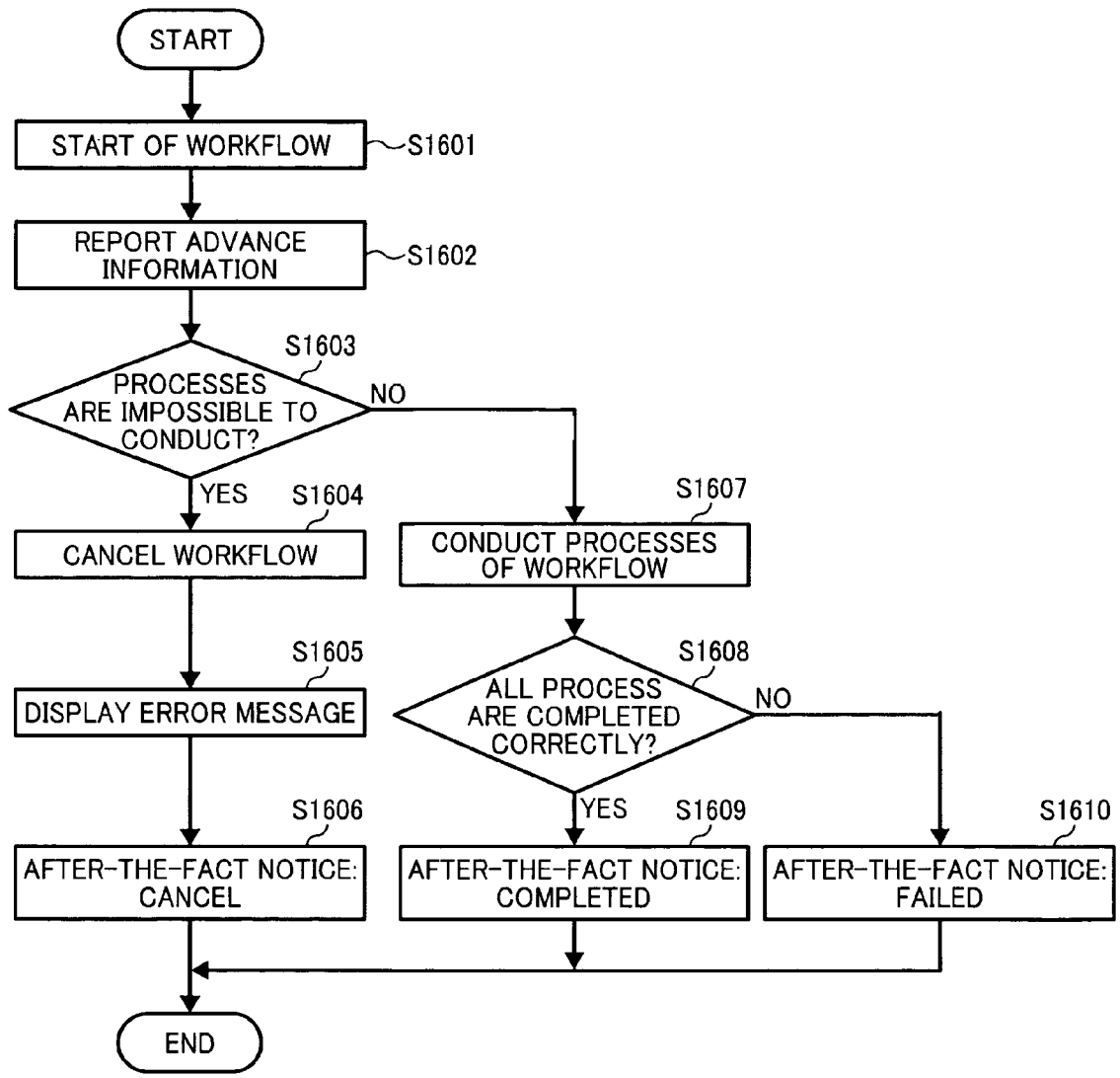
FIG. 16 is a flowchart for executing a workflow for an image processing apparatus according to an example embodiment.

A description is now given to an example process for executing a workflow in the image processing apparatus 3 with reference to FIG. 16. A user may use the display panel 304 of the image processing apparatus 3 to instruct a workflow execution, for example.

When the user instructs a start of a given workflow (hereinafter referred to as "designated workflow") at step S1601, the workflow controller 311*a* obtains process information included in the designated workflow from the workflow information storage 316, and reports all processes included in the designated workflow to the event plug-in 311*b* as "advance information" before the processes are actually conducted (step S1602). In step S1601 and S1602, the main control unit 311 may function as an execution instruction obtaining unit.

When the event plug-in 311*b* is reported from the workflow controller 311*a*, the event plug-in 311*b* checks whether all processes can be conducted (step S1603). Step S1603 will be described in detail later.

If it is determined that any one of processes is impossible to conduct at step S1603 (Yes at step S1603), the event plug-in 311*b* reports to the workflow controller 311*a* that the workflow is impossible to conduct. Upon receiving such impossible-to-conduct report, the workflow controller 311*a* cancels to execute the workflow instructed by the user (step S1604). Further, the main control unit 311 controls the operation unit controller 315 to display an error message indicating the workflow is impossible to execute on the display panel 304 (step S1605).

After canceling the workflow execution and notifying the error message to a user, the workflow controller 311*a* reports an after-the-fact notice indicating cancellation of workflow execution to the event plug-in 311*b* (step S1606), and then the process ends.

If it is determined that all processes can be conducted at step S1603 (No at step S1603), the event plug-in 311*b* reports to the workflow controller 311*a* that the workflow execution is possible. Upon receiving the report that the workflow execution is possible, the workflow controller 311*a* conducts all processes included in the designated workflow with a given sequential order (step S1607). In step S1607, the main control unit 311 may function as a process execution unit.

If all processes are completed successfully (Yes at step S1608), the workflow controller 311*a* reports an after-the-fact notice indicating that workflow execution is completed successfully to the event plug-in 311*b* (step S1609). Then, the event plug-in 311*b* conducts a post-processing related to a completion of workflow execution. Such post-processing may be charging money for an actually conducted billing process, for example. If such post-processing is not conducted, information consistency for a workflow system cannot be secured. For example, if charged money is not recorded in a workflow system when a process related to billing is actually conducted, money information becomes incorrect.

If all processes are not completed successfully (No at step S1608), the workflow controller 311*a* reports an after-the-fact notice indicating that the workflow execution is failed to the event plug-in 311*b* (step S1610), and then the process ends.

Figure 17:
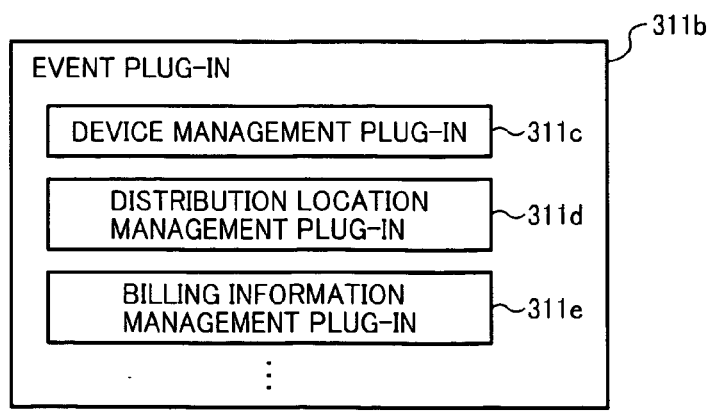
FIG. 17 illustrates an example event plug-in of image processing apparatus according to an example embodiment.

A description is now given to the event plug-in 311*b* and processing at step S1603 with reference to FIG. 17. As shown in FIG. 17, the event plug-in 311*b* may include a device management plug-in 311*c*, a distribution location management plug-in 311*d*, and a billing management plug-in 311*e*, for example.

If a given process, to be conducted using the application server 4, is included in process information reported at step S1602, the device management plug-in 311*c* checks status of the application server 4 at step S1603. When the application server 4 is down due to some reasons (e.g. power-off), or when the application server 4 cannot conduct a requested given process with a higher processing speed because of heavy workload being processed in the application server 4, the device management plug-in 311*c* determines that workflow execution is impossible.

For example, if a given process to be conducted by the application server 4 is set (or integrated) at a last part of workflow, the application server 4 conducts the given process after other processes are completed. If the application server 4 cannot conduct the given process, the workflow execution cannot be completed, and an error condition occurs. In this case, a user may recognize that the workflow execution is impossible at the very end of workflow, which is a waste of time for user.

On the contrary, as above described, in an example embodiment, an "advance notice" can be reported to a user, by which a user can recognize whether the workflow execution is possible at an earlier timing. Accordingly, if an impossible-to-conduct process is included in a workflow, a user can recognize that the workflow cannot be completed at an earlier timing, by which a waste of time for user can be reduced or eliminated.

At step S1603, the distribution location management plug-in 311d checks distribution location or storing location of document information, which is instructed to execute as a process of workflow. The distribution location management plug-in 311d retains information, similar to information shown in FIG. 10, and checks whether a document information can be distributed to a designated distribution location. If the designated distribution location is set as distribution-not-allowed condition, the distribution location management plug-in 311d determines that workflow execution is impossible. Accordingly, as similar to an effect of the device management plug-in 311c, a user can recognize that the workflow cannot be completed at an earlier timing, by which a waste of time for user can be reduced or eliminated.

At step S1603, the billing management plug-in 311e checks billing information, which is instructed to execute as a process of a workflow. The billing management plug-in 311e retains information, similar to information shown in FIGS. 11 and 12, and determines whether a process for process plug-in can be conducted based on a comparison of billing money information of process plug-in that is instructed to be conducted and pre-paid money value; or based on a comparison of accumulated billed money value and predetermined money value. Accordingly, as similar to an effect of the device management plug-in 311c, a user can recognize that the workflow cannot be completed at an earlier timing, by which a waste of time for user can be reduced or eliminated.

In the above-described example embodiment, the event plug-in 103 and the event plug-in 311b may be configured as shown in FIGS. 7 and 17, for example. However, an administrator of system can change a configuration of plug-ins using different event plug-ins having different functions.

As such, the event plug-in 103 and the event plug-in 311b can be configured with any types of plug-ins. When the workflow construction unit 102 or the workflow controller 311a outputs "before-event" information to the event plug-in 103 or the event plug-in 311b respectively, the event plug-in 103 and the event plug-in 311b may functions as an implementation-determination unit that determines whether an given process corresponded to such "before-event" information can be conducted.

For example, in the above-described example embodiment, the event plug-in 103 and the event plug-in 311b may determine whether a given process corresponded to such "before-event" information can be conducted. Further, the event plug-in 103 and the event plug-in 311b may determine whether an given process corresponded to such "before-event" information can be conducted using an external apparatus such as application server 4, file management server 5, or the like by accessing to such external apparatus via a network.

As above described, in an example embodiment, a method of constructing a workflow configured with a plurality of processes, using information of the processes for constructing the workflow being storable in a workflow information storage using a workflow information generation unit. The method includes the steps of a) obtaining process-designation information designating a process to be included in the workflow using a process-designation information obtaining unit; b) outputting advance notice information by using an advance notice output unit, the advance notice information notifying that information of the process designated by the obtained process-designation information is to be stored in the workflow information storage before storing the designated process in the workflow information storage; c) obtaining implementation-determination information when the advance notice information is output using an implementation-determination information obtaining unit, the implementation-determination information indicating whether the designated process is allowed to be included in the workflow; d) storing information of the designated process to the workflow information storage, using a process information output unit, when the obtained implementation-determination information indicates that the designated process is allowed to be included in the workflow; and e) outputting result information for the designated process by preliminarily running the designated process when constructing the workflow using a result information output unit, the result information being prepared based on the obtained implementation-determination information indicating whether the designated process is allowed to be included in the workflow.

The above-described method further includes an implementation-determination unit that receives the output advance notice information, determines whether the designated process is allowed to be included in the workflow, and outputs the implementation-determination information.

In the above-described method, when the designated process is implementable by an application program, the implementation-determination unit determines whether the designated process is allowed to be included in the workflow based on usage condition information for the application program.

In the above-described method, the implementation-determination unit updates the usage condition information for the application program upon receiving the output result information.

In the above-described method, the designated process is implemented by an external device communicably connected to the workflow information generation unit, and the implementation-determination unit determines whether the designated process is allowed to be included in the workflow based on usage condition information for the external device.

In the above-described method, the implementation-determination unit updates the usage condition information for the external device upon receiving the output result information.

In the above-described method, the designated process includes a transmission process for transmitting given information to a designated distribution location, and the implementation-determination unit determines whether the transmission process is allowed to be included in the workflow based on whether the given information is transmittable to the distribution location.

In the above-described method, when the designated process is associated with billing information prepared from charge information for the designated process, the implementation-determination unit determines whether the designated process is allowed to be included in the workflow based on the billing information for the designated process.

In the above-described method, the implementation-determination unit updates the billing information for the designated process upon receiving the output result information.

The above-described method further includes a notice information generator to prepare and report notice information for a user of the workflow information generation unit indicating that the designated process is not allowed to be included in the workflow when the obtained implementation-determination information indicates that the designated process is not allowed to be included in the workflow.

In the above-described method, the notice information indicates why the designated process is not allowed to be included in the workflow.

In the above-described method, when the obtained implementation-determination information indicates that the designated process is not allowed to be included in the workflow, the result information output unit outputs the result information indicating that inclusion of the designated process in the workflow is rejected.

In the above-described method, when the process information output unit completes storing information of the designated process in the workflow information storage, the result information output unit outputs the result information indicating that the designated process is correctly included in the workflow.

As above described, in an example embodiment, an image processing apparatus that executes a workflow configured with a plurality of processes, includes a workflow information generation unit used for constructing a workflow constructable by storing information of the processes in a workflow information storage; an execution instruction obtaining unit to obtain information to designate a workflow to be executed and information to instruct execution of the workflow; an advance notice output unit to output advance information to notify that the processes included in the workflow are to be implemented; an implementation-determination information obtaining unit to obtain implementation-determination information for the processes when the advance information is output, the implementation-determination information indicating whether the processes included in the workflow are implementable; a process execution unit to execute the processes included in the workflow when the obtained implementation-determination information indicates the processes included in the workflow are implementable; and a result information output unit to output result information indicating a result of the implemented process based on the obtained implementation-determination information.

The above-described image processing apparatus further includes an implementation-determination unit that receives the output advance notice information, determines whether the designated process is allowed to be included in the workflow, and outputs the implementation-determination information.

In the above-described image processing apparatus, when the designated process is implementable by an application program, the implementation-determination unit determines whether the designated process is allowed to be included in the workflow based on usage condition information for the application program.

In the above-described image processing apparatus, the implementation-determination unit updates the usage condition information for the application program upon receiving the output result information.

In the above-described image processing apparatus, the designated process is implemented by an external device communicably connected to the workflow information generation unit, and the implementation-determination unit determines whether the designated process is allowed to be included in the workflow based on usage condition information for the external device.

In the above-described image processing apparatus, the implementation-determination unit updates the usage condition information for the external device upon receiving the output result information.

In the above-described image processing apparatus, the designated process includes a transmission process for transmitting given information to a designated distribution location, and the implementation-determination unit determines whether the transmission process is allowed to be included in the workflow based on whether the given information is transmittable to the distribution location.

In the above-described image processing apparatus, when the designated process is associated with billing information prepared from charge information for the designated process, the implementation-determination unit determines whether the designated process is allowed to be included in the workflow based on the billing information for the designated process.

In the above-described image processing apparatus, the implementation-determination unit updates the billing information for the designated process upon receiving the output result information.

The above-described image processing apparatus further includes a notice information generator to prepare and report notice information for a user of the workflow information generation unit indicating that the designated process is not allowed to be included in the workflow when the obtained implementation-determination information indicates that the designated process is not allowed to be included in the workflow.

In the above-described image processing apparatus, the notice information indicates why the designated process is not allowed to be included in the workflow.

In the above-described image processing apparatus, when the obtained implementation-determination information indicates that the designated process is not allowed to be included in the workflow, the result information output unit outputs the result information indicating that inclusion of the designated process in the workflow is rejected.

In the above-described image processing apparatus, when the process information output unit completes storing information of the designated process in the workflow information storage, the result information output unit outputs the result information indicating that the designated process is correctly included in the workflow.

In the above-described example embodiment, a SDK/API system coordinated with an externally-provided program may be employed for a workflow system, and by using such workflow system, inconsistency of information can be detected at a earlier timing as above described. The workflow system using SDK/API system coordinated with an externally-provided program can be expanded its function by modifying a system configuration, as required.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A workflow information generation unit configured to construct workflow, using a processor, having a plurality of processes, information of the plurality of processes includable in the workflow and storable in a workflow information storage using the workflow information generation unit, the workflow information generation unit comprising:
- a process-designation information obtaining unit configured to obtain process-designation information using the processor to design a process to be included in the workflow;
- an advance notice output unit to output, using the processor, advance notice information notifying that information of the process designated by the obtained process-designation information is to be stored in the workflow information storage before storing information of the designated process in the workflow information storage;
- an implementation-determination information obtaining unit to obtain implementation-determination information using the processor, when the advance notice information is output, the implementation-determination information indicating whether the designated process is allowed to be included in the workflow;
- a process information output unit to store information of the designated process to the workflow information storage using the processor, when the obtained implementation-determination information indicates that the designated process is allowed to be included in the workflow;
- a result information output unit to output result information for the designated process by preliminarily running the designated process using the processor, when constructing the workflow, the result information prepared based on the obtained implementation-determination information indicating whether the designated process is allowed to be included in the workflow; and
- an implementation-determination unit configured to determine, using the processor, whether the designated process is allowed to be included in the workflow based on usage condition information for an application program, if the designated process is implementable by the application program, usage condition information for an external device, if the designated process is implemented by the external device communicably connected to the workflow information generation unit, given information transmitted by a transmission process to a designated distribution location, if the designated process includes the transmission process, and billing information for the designated process prepared from charge information, if the designated process is associated with the billing information.

2. The workflow information generation unit according to claim 1, wherein the implementation-determination unit updates the usage condition information for the application program upon receiving the output result information.

3. The workflow information generation unit according to claim 1, wherein the implementation-determination unit updates the usage condition information for the external device upon receiving the output result information.

4. The workflow information generation unit according to claim 1, wherein the implementation-determination unit updates the billing information for the designated process upon receiving the output result information.

5. The workflow information generation unit according to claim 1, further comprising:
- a notice information generator configured to prepare and report, using the processor, notice information for a user of the workflow information generation unit indicating that the designated process is not allowed to be included in the workflow when the obtained implementation-determination information indicates that the designated process is not allowed to be included in the workflow.

6. The workflow information generation unit according to claim 5, wherein the notice information indicates why the designated process is not allowed to be included in the workflow.

7. The workflow information generation unit according to claim 5, wherein when the obtained implementation-determination information indicates that the designated process is not allowed to be included in the workflow, the result information output unit outputs the result information indicating that inclusion of the designated process in the workflow is rejected.

8. The workflow information generation unit according to claim 1, wherein when the process information output unit completes storing information of the designated process in the workflow information storage, the result information output unit outputs, using the processor, the result information indicating that the designated process is correctly included in the workflow.

9. A method of constructing a workflow configured with a plurality of processes, information of the processes for constructing the workflow being storable in a workflow information storage using a workflow information generation unit, the method comprising:
- a) obtaining process-designation information designating a process to be included in the workflow using a process-designation information obtaining unit;
- b) outputting advance notice information by using an advance notice output unit, the advance notice information notifying that information of the process designated by the obtained process-designation information is to be stored in the workflow information storage before storing the designated process in the workflow information storage;
- c) obtaining implementation-determination information when the advance notice information is output using an implementation-determination information obtaining unit, the implementation-determination information indicating whether the designated process is allowed to be included in the workflow;
- d) storing information of the designated process to the workflow information storage, using a process information output unit, when the obtained implementation-determination information indicates that the designated process is allowed to be included in the workflow;
- e) outputting result information for the designated process by preliminary running the designated process when constructing the workflow using a result information output unit, the result information being prepared based on the obtained implementation-determination information indicating whether the designated process is allowed to be included in the workflow; and
- f) determining whether the designated process is allowed to be included in the workflow based on usage condition information for an application program, if the designated process is implementable by the application program, usage condition information for an external device, if the designated process is implemented by the external device communicably connected to the workflow information generation unit, given information transmitted by a transmission process to a designated distribution location, if the designated process includes the transmission process, and billing information for the designated process prepared from charge information, if the designated process is associated with the billing information.

10. An image processing apparatus that executes a workflow, using a processor, having a plurality of processes, the image processing apparatus comprising:
- a workflow information generation unit configured to construct, using the processor, a workflow constructable by storing information of the processes in a workflow information storage;
- an execution instruction obtaining unit configured to obtain, using the processor, information to designate a workflow to be executed and information to instruct execution of the workflow;
- an advance notice output unit to output, using the processor, advance information configured to notify that the processes included in the workflow are to be implemented;
- an implementation-determination information obtaining unit configured to obtain, using the processor, implementation-determination information for the processes when the advance information is output, the implementation-determination information indicating whether the processes included in the workflow are implementable;
- a process execution unit configured to execute, using the processor, the processes included in the workflow when the obtained implementation-determination information indicates the processes included in the workflow are implementable;
- a result information output unit configured to output, using the processor, result information indicating a result of the implemented process based on the obtained implementation-determination information; and
- an implementation-determination unit configured to determine, using the processor, whether the designated process is allowed to be included in the workflow based on usage condition information for an application program, if the designated process is implementable by the application program, usage condition information for an external device, if the designated process is implemented by the external device communicably connected to the workflow information generation unit, given information transmitted by a transmission process to a designated distribution location, if the designated process includes the transmission process, and billing information for the designated process prepared from charge information, if the designated process is associated with the billing information.

* * * * *

UNITED STATES PATENT AND TRADEMARK OFFICE
CERTIFICATE OF CORRECTION

PATENT NO. : 8,327,362 B2  
APPLICATION NO. : 12/591696  
DATED : December 4, 2012  
INVENTOR(S) : Atsuko Yagi Page 1 of 1

It is certified that error appears in the above-identified patent and that said Letters Patent is hereby corrected as shown below:

On the Title Page, Item (30) should read

(30) Foreign Application Priority Data

Nov. 28, 2008   (JP) ............ 2008-304950

Signed and Sealed this
Eighteenth Day of June, 2013

Teresa Stanek Rea
*Acting Director of the United States Patent and Trademark Office*